US011055467B2

(12) United States Patent
Liu et al.

(10) Patent No.: US 11,055,467 B2
(45) Date of Patent: Jul. 6, 2021

(54) METHOD AND APPARATUS FOR PERFORMING POWER MESH OPTIMIZATION WITH AID OF ADDITIONAL WIRES

(71) Applicant: Realtek Semiconductor Corp., HsinChu (TW)

(72) Inventors: Chien-Cheng Liu, HsinChu (TW); Yun-Chih Chang, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 16/876,151

(22) Filed: May 18, 2020

(65) Prior Publication Data
US 2021/0173997 A1     Jun. 10, 2021

(30) Foreign Application Priority Data

Dec. 6, 2019    (TW) ................................ 108144595

(51) Int. Cl.
| | | |
|---|---|---|
| *G06F 30/30* | (2020.01) | |
| *G06F 30/396* | (2020.01) | |
| *G06F 30/394* | (2020.01) | |
| *G06F 30/327* | (2020.01) | |
| *G06F 30/398* | (2020.01) | |
| *G06F 119/06* | (2020.01) | |
| *G06F 119/10* | (2020.01) | |

(52) U.S. Cl.
CPC .......... *G06F 30/396* (2020.01); *G06F 30/327* (2020.01); *G06F 30/394* (2020.01); *G06F 30/398* (2020.01); *G06F 2119/06* (2020.01); *G06F 2119/10* (2020.01)

(58) Field of Classification Search
None
See application file for complete search history.

(56) References Cited

U.S. PATENT DOCUMENTS

| | | | | |
|---|---|---|---|---|
| 7,240,314 B1 * | 7/2007 | Leung | ..................... | G06F 30/39 257/773 |
| 7,698,677 B2 * | 4/2010 | Zhao | ..................... | G06F 30/394 716/122 |
| 10,048,739 B2 * | 8/2018 | Liu | ........................... | G06F 1/10 |

* cited by examiner

*Primary Examiner* — Leigh M Garbowski
(74) *Attorney, Agent, or Firm* — Winston Hsu

(57) ABSTRACT

A method for performing power mesh optimization with the aid of additional wires and an associated apparatus are provided. The method includes: reading a clock cell definition file to obtain respective basic information of a plurality of clock cells in a circuit design; and according to the respective basic information of the plurality of clock cells, executing a power mesh optimization procedure, including: regarding any type of clock cells in multiple types of clock cells within the plurality of clock cells, classifying the clock cells into a plurality of sub-types according to respective sizes of the type of clock cells; and performing power mesh enhancement on respective clock cells of a set of sub-types within the plurality of sub-types, to add a set of additional wires crossing a set of original wires in an original power mesh at each clock cell of any sub-type of the set of sub-types.

18 Claims, 7 Drawing Sheets

METHOD AND APPARATUS FOR PERFORMING POWER MESH OPTIMIZATION WITH AID OF ADDITIONAL WIRES

BACKGROUND OF THE INVENTION

1. Field of the Invention

The present invention is related to electronic circuits, and more particularly, to a method and an associated apparatus such as a manufacturing tool for performing power mesh optimization with the aid of additional wires.

2. Description of the Prior Art

Clock tree synthesis methods may easily introduce problems, such as voltage drop (or current-resistance (IR) drop) and electromagnetic interference (EMI). More particularly, when these problems are found in a late period of a design phase, solutions are few, and error detection may be time consuming. In addition, regarding routing, if regions in which these problems occur are crowded, finding an effective solution might be impossible. Thus, there is a need for a novel method and an associated architecture that can solve the problems of the related art without introducing any side effect or in a way that is less likely to introduce side effects.

SUMMARY OF THE INVENTION

An objective of the present invention is to provide a method and an associated apparatus such as a manufacturing tool for performing power mesh optimization with the aid of additional wires, to solve the aforementioned problems.

At least one embodiment of the present invention provides a method for performing power mesh optimization with the aid of additional wires, wherein the method is applicable to a clock tree. The method may comprise: reading a clock cell definition file to obtain respective basic information of a plurality of clock cells in a circuit design, wherein basic information of a clock cell within the plurality of clock cells at least indicates a type and a size of the clock cell; and according to the respective basic information of the plurality of clock cells, executing a power mesh optimization procedure to generate a power mesh optimization result. The power mesh optimization procedure may comprise: regarding any type of clock cells amongst multiple types of clock cells within the plurality of clock cells, classifying the aforementioned types of clock cells into a plurality of sub-types according to respective sizes of the aforementioned types of clock cells; and performing power mesh enhancement on respective clock cells of a set of sub-types within the plurality of sub-types, in order to add a set of additional wires crossing a set of original wires in an original power mesh at each clock cell of any sub-type of the set of sub-types to act as a set of optimal power mesh, wherein a wire width of the set of optimal power mesh corresponds to the aforementioned any sub-type, and the power mesh optimization result comprises the original power mesh and the set of optimal power mesh.

In addition to the aforementioned method, the present invention also provides an apparatus for performing power mesh optimization with the aid of additional wires, wherein the apparatus is applicable to a clock tree. The apparatus may comprise a processing circuit and a storage device coupled to the processing circuit. The processing circuit may be configured to execute a program code corresponding to a power mesh optimization procedure to control operations of the apparatus, in order to execute the power mesh optimization procedure. In addition, the storage device may be configured to store a clock cell definition file for being read by the processing circuit. More particularly, the processing circuit reads the clock cell definition file to obtain respective basic information of a plurality of clock cells in a circuit design, wherein basic information of a clock cell within the plurality of clock cells at least indicates a type and a size of the clock cell. In addition, according to the respective basic information of the plurality of clock cells, the processing circuit executes the power mesh optimization procedure to generate a power mesh optimization result. The power mesh optimization procedure comprises: regarding any type of clock cells amongst multiple types of clock cells within the plurality of clock cells, the processing circuit classifies the aforementioned types of clock cells into a plurality of sub-types according to respective sizes of the aforementioned types of clock cells; and the processing circuit performs power mesh enhancement on respective clock cells of a set of sub-types within the plurality of sub-types, to add a set of additional wires crossing a set of original wires in the original power mesh at each clock cell of any sub-type of the set of sub-types to act as a set of optimal power mesh, wherein a wire width of the set of optimal power mesh corresponds to the aforementioned any sub-type, and the power mesh optimization result comprises the original power mesh and the set of optimal power mesh.

The method and the associated apparatus of the present invention can guarantee that an electronic device manufactured according to the circuit design can properly operate under various conditions. In addition, implementation according to associated embodiments of the present invention will not greatly increase additional costs. Thus, the problems of the related art can be solved. In comparison with the related art, the present invention can implement robust power mesh in an electronic device without introducing any side effect or in a way that is less likely to introduce side effects.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
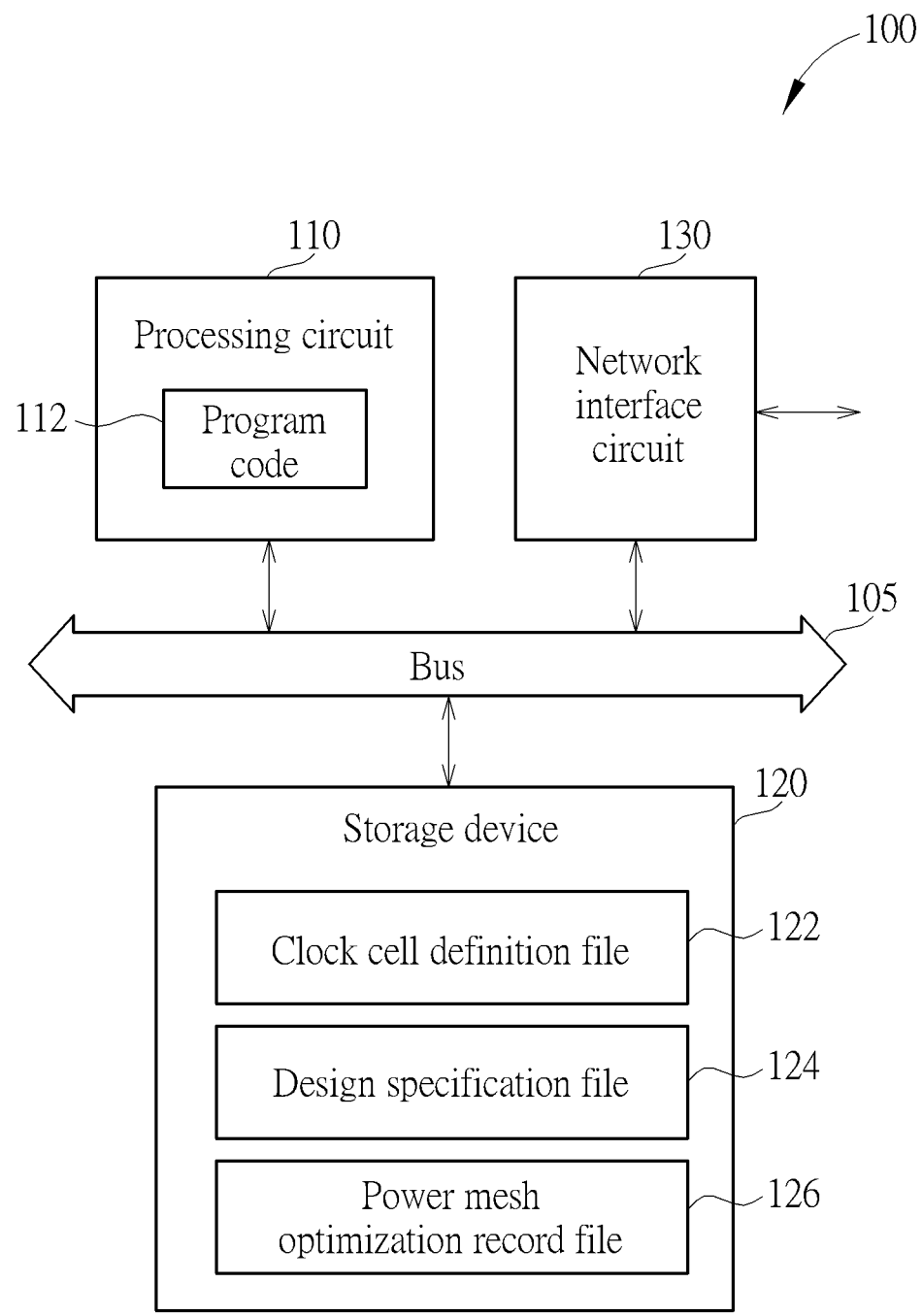
FIG. 1 is a diagram illustrating an apparatus for performing power mesh optimization with the aid of additional wires according to an embodiment of the present invention.

FIG. 1 is a diagram illustrating an apparatus 100 for performing power mesh optimization with the aid of additional wires according to an embodiment of the present invention, where the apparatus 100 may be a manufacturing tool for performing power mesh optimization. The apparatus 100 may comprise a processing circuit 100, at least one storage device such as a storage device 120, and a network interface circuit 130, wherein the above components may be coupled to one another through a bus 105, but the present invention is not limited thereto. In some embodiments, the architecture shown in FIG. 1 may vary. As shown in FIG. 1, the processing circuit 110 may execute at least one predetermined program code to control operations of the apparatus 100, the storage device 120 may store information for the apparatus 100, and the network interface circuit 130 may couple the apparatus 100 to at least one network to provide the apparatus 100 with at least one network service. Based on the architecture shown in FIG. 1, in an early period of a circuit design phase, the apparatus 100 may perform effective optimization operations for a user (such as a circuit designer) to thereby solve the problems of the related art.

In the aforementioned embodiment, the apparatus 100 may be implemented by a personal computer executing the aforementioned at least one predetermined program code. The processing circuit 110 may be implemented by a central processing unit (CPU), a memory, and a chip set, etc.

Figure 2:
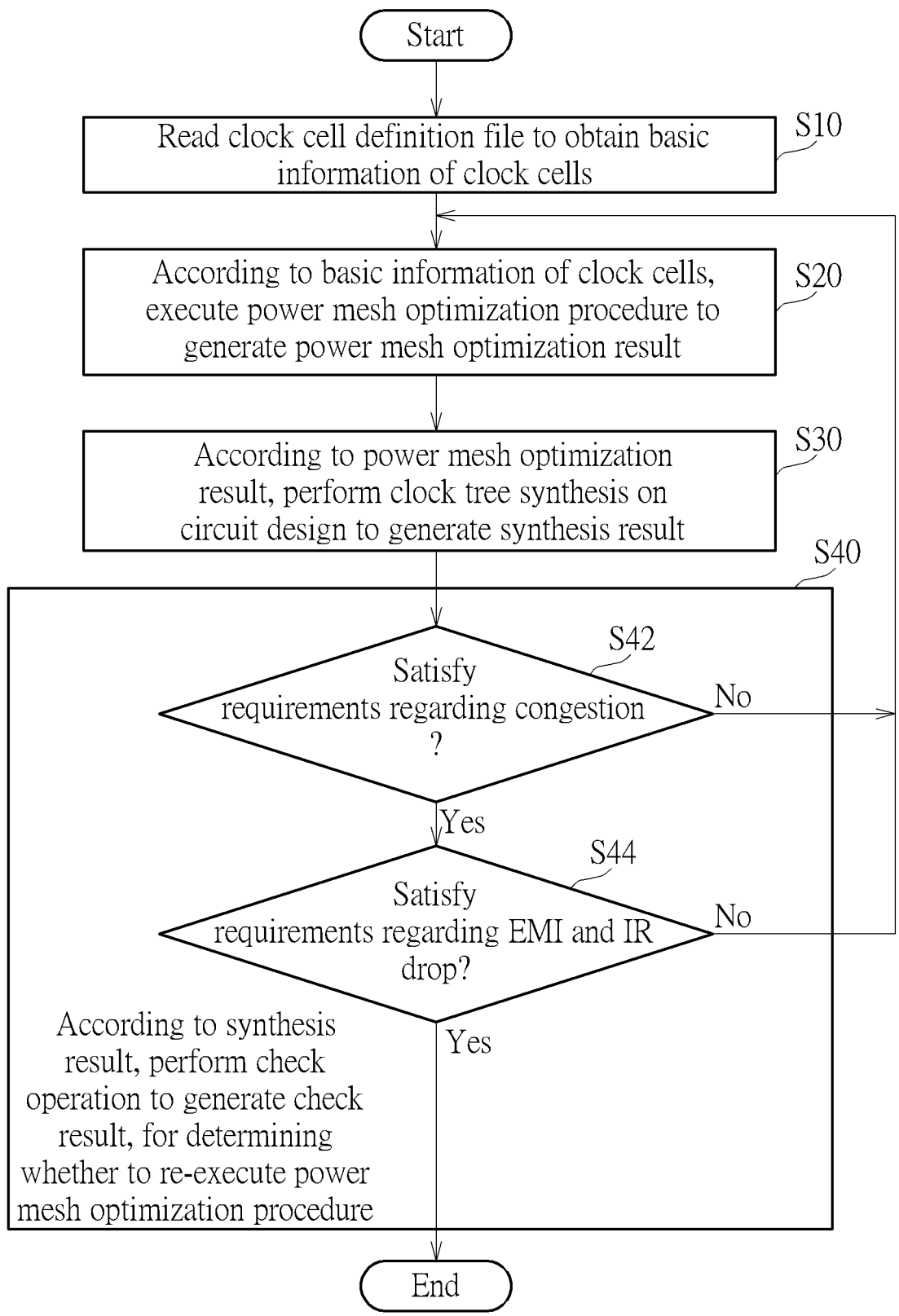
FIG. 2 is a flowchart illustrating a method for performing power mesh optimization with the aid of additional wires according to an embodiment of the present invention.

FIG. 2 is a flowchart illustrating a method for performing power mesh optimization with the aid of additional wires according to an embodiment of the present invention. The method is applicable to a clock tree, and more particularly, to clock tree synthesis (CTS). The processing circuit 110 may be configured to execute a program code 112 corresponding to the method to control operations of the apparatus 100 (e.g. the manufacturing tool), to execute a power mesh optimization procedure, where the program code 112 may be an example of the aforementioned at least one predetermined program code.

In Step S10, the processing circuit 110 may read a clock cell definition file 122 to obtain respective basic information of a plurality of clock cells in a circuit design, where basic information of a clock cell within the plurality of clock cells at least indicates a type and a size of the clock cell, and more particularly, further indicates a name and a location of the clock cell. Therefore, the processing circuit 110 may obtain respective names, locations, types and sizes of the plurality of clock cells from the clock cell definition file 122. According to this embodiment, the storage device 120 may be configured to store multiple files such as the clock cell definition file 122 for being read by the processing circuit 110.

In Step S20, according to the respective basic information of the plurality of clock cells, the processing circuit 110 may execute the power mesh optimization procedure to generate a power mesh optimization result.

In Step S30, according to the power mesh optimization result, the processing circuit 110 may perform the aforementioned clock tree synthesis on the circuit design to generate a synthesis result, where the synthesis result may indicate routing of at least one clock tree within the circuit design. For example, the processing circuit 110 may read a design specification file 124 to obtain design specification (e.g. a size of a circuit architecture of the circuit design, and clock tree requirements such as a target range of a clock period) of the circuit design for performing the clock tree synthesis, and may store the synthesis result into a power mesh optimization record file 126. According to this embodiment, the clock cell definition file 122 and the design specification file 124 are preferably provided by the user such as the circuit designer, but the present invention is not limited thereto.

In Step S40, according to the synthesis result, the processing circuit 40 may perform at least one check operation to generate at least one check result, for determining whether to re-execute the power mesh optimization procedure, where the aforementioned at least one check result may indicate whether the routing of the aforementioned at least one clock tree satisfies requirements regarding at least one check item (e.g. congestion, current-resistance (IR) drop, electromagnetic interference (EMI), etc.). According to this embodiment, Step 40 may comprise multiple sub-steps such as Steps S42 and S44.

In Step S42, the processing circuit 110 may determine whether the synthesis result satisfies requirements regarding the congestion. If Yes, Step 44 is executed; if No, Step S30 is executed. For example, the requirement regarding the congestion may comprise: not exceeding fifty congestion points.

In Step S44, the processing circuit 110 may determine whether the synthesis result satisfies requirements regarding EMI and the IR drop. If Yes, this working flow ends, e.g. operations of a next phase are performed; if No, Step S30 is executed.

Based on the working flow shown in FIG. 2, in response to the aforementioned at least one check result (e.g. check results of the multiple sub-steps such as Steps S42 and S44), the processing circuit 110 may re-execute the power mesh optimization procedure according to at least one updated parameter of the power mesh optimization procedure to update the power mesh optimization result. Therefore, before performing the operations of the next phase, the apparatus 100 may perform efficient optimization operations in advance for the user such as the circuit designer, rather than trying to detect errors in a late period of the design phase as occurs in the related art, to thereby thoroughly solve problems of the related art.

For better comprehension, the method may be illustrated with the working flow shown in FIG. 2, but the present invention is not limited thereto. According to some embodiments, one or more steps may be added, deleted or modified in the working flow shown in FIG. 2.

Figure 3:
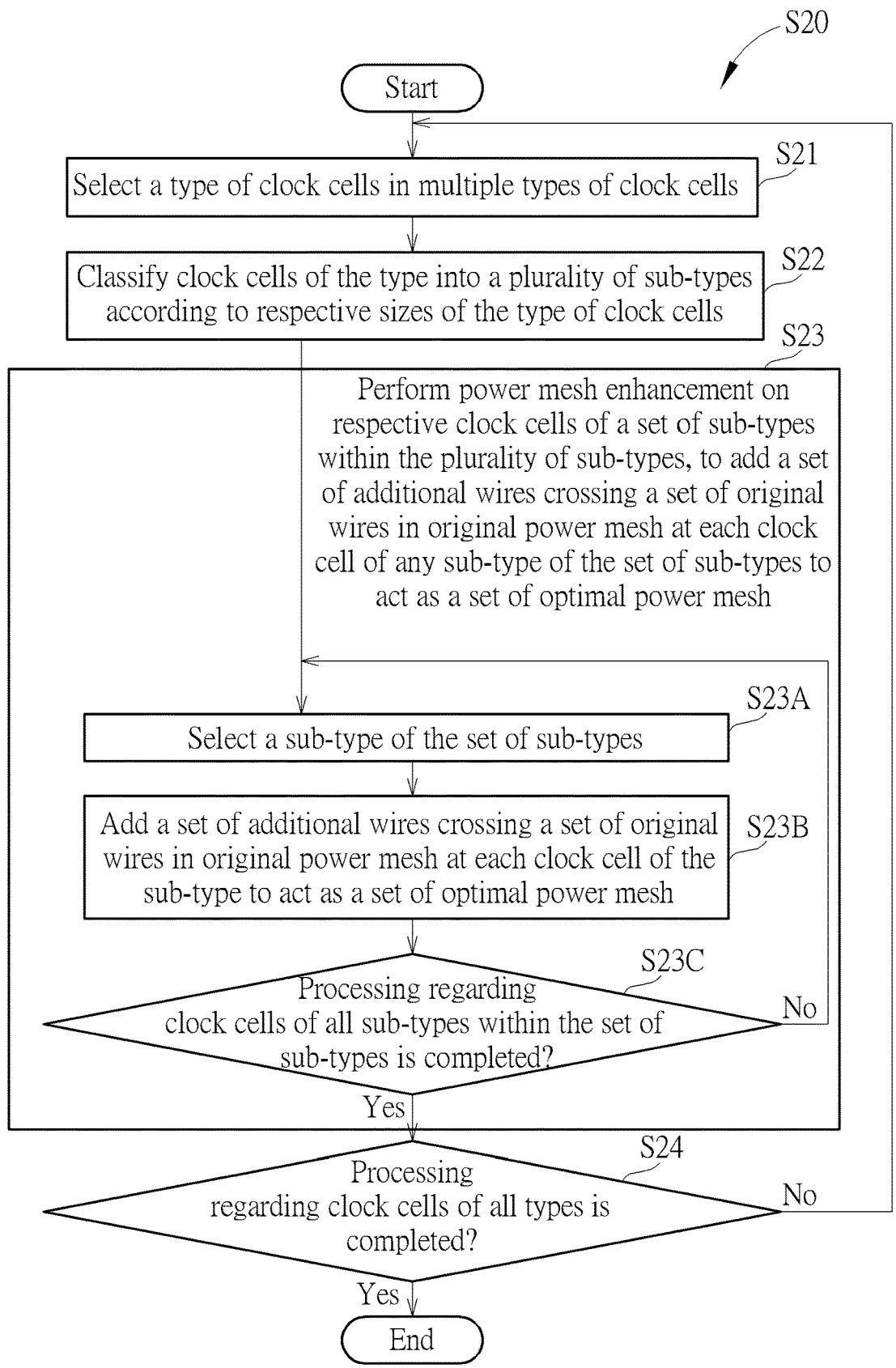
FIG. 3 illustrates a working flow of a power mesh optimization procedure of the method shown in FIG. 2 according to an embodiment of the present invention.

FIG. 3 illustrates a working flow of the power mesh optimization procedure of the method shown in FIG. 2 according to an embodiment of the present invention.

In Step S21, the processing circuit 110 may select a type of clock cells in multiple types of clock cells within the plurality of clock cells. The multiple types of clock cells may comprise:

(A) clock cells of a type A, comprising buffers and inverters;
(B) clock cells of a type B, comprising multiplexers (MUX)
(C) clock cells of a type C, comprising NOR gates; and
(D) clock cells of a type D, comprising AND gates;

but the present invention is not limited thereto.

In Step S22, the processing circuit 110 may classify the clock cells of the selected type (just selected in Step S21) into a plurality of sub-types according to respective sizes of the type of clock cells, where the plurality of sub-types correspond to different size ranges, respectively. For example, when the type A is selected, sub-types thereof may comprise sub-types A1, A2, etc.; when the type B is selected, sub-types thereof may comprise sub-types B1, B2, etc.; when the type C is selected, sub-types thereof may comprise sub-types C1, C2, etc.; and when the type D is selected, sub-types thereof may comprise sub-types D1, D2, etc.

In Step S23, the processing circuit 110 may perform power mesh enhancement on respective clock cells of a set of sub-types within the plurality of sub-types (which are just classified in Step S22), to add a set of additional wires crossing a set of original wires in an original power mesh at each clock cell of any sub-type of the set of sub-types to act as a set of optimal power mesh, where a wire width of the set of optimal power mesh corresponds to this sub-type (i.e. the "any sub-type" mentioned above), and the power mesh optimization result comprises the original power mesh and the set of optimal power mesh.

In Step S23A, the processing circuit 110 may select a sub-type of the set of sub-types.

In Step S23B, the processing circuit 110 may add a set of additional wires crossing a set of original wires in the original power mesh at each clock cell of the sub-type (just selected in Step S23A) to act as a set of optimal power mesh.

In Step S23C, the processing circuit 110 may determine whether processing regarding clock cells of all sub-types within the set of sub-types is completed. If Yes, Step S24 is executed; if No, Step S23A is executed, by processing clock cells of a next sub-type within the set of sub-types.

In Step S24, the processing circuit 110 may determine whether processing regarding clock cells of all types is completed. If Yes, this working flow ends and Step S30 is executed; if No, Step S21 is executed, by processing a next type of clock cells within the multiple types of clock cells.

Based on the working flow shown in FIG. 3, regarding any type of clock cells within the multiple types of clock cells, the processing circuit 110 may classify this type of clock cells into sub-types thereof according to respective sizes of the aforementioned any type of clock cells, and perform power mesh enhancement on clock cells of a portion of sub-types within these sub-types. This involves adding multiple sets of additional wires crossing multiple sets of original wires (in the original power mesh) at the clock cells of the portion of sub-types to act as multiple sets of optimal power mesh, respectively, wherein respective wire widths of the multiple sets of optimal power mesh may correspond to the portion of sub-types respectively, and the power mesh optimization result may comprise the original power mesh and the multiple sets of optimal power mesh.

For better comprehension, the method (more particularly, the power mesh optimization procedure) may be illustrated with the working flow shown in FIG. 3, but the present invention is not limited thereto. According to some embodiments, one or more steps may be added, deleted or modified in the working flow shown in FIG. 3.

Figure 4:
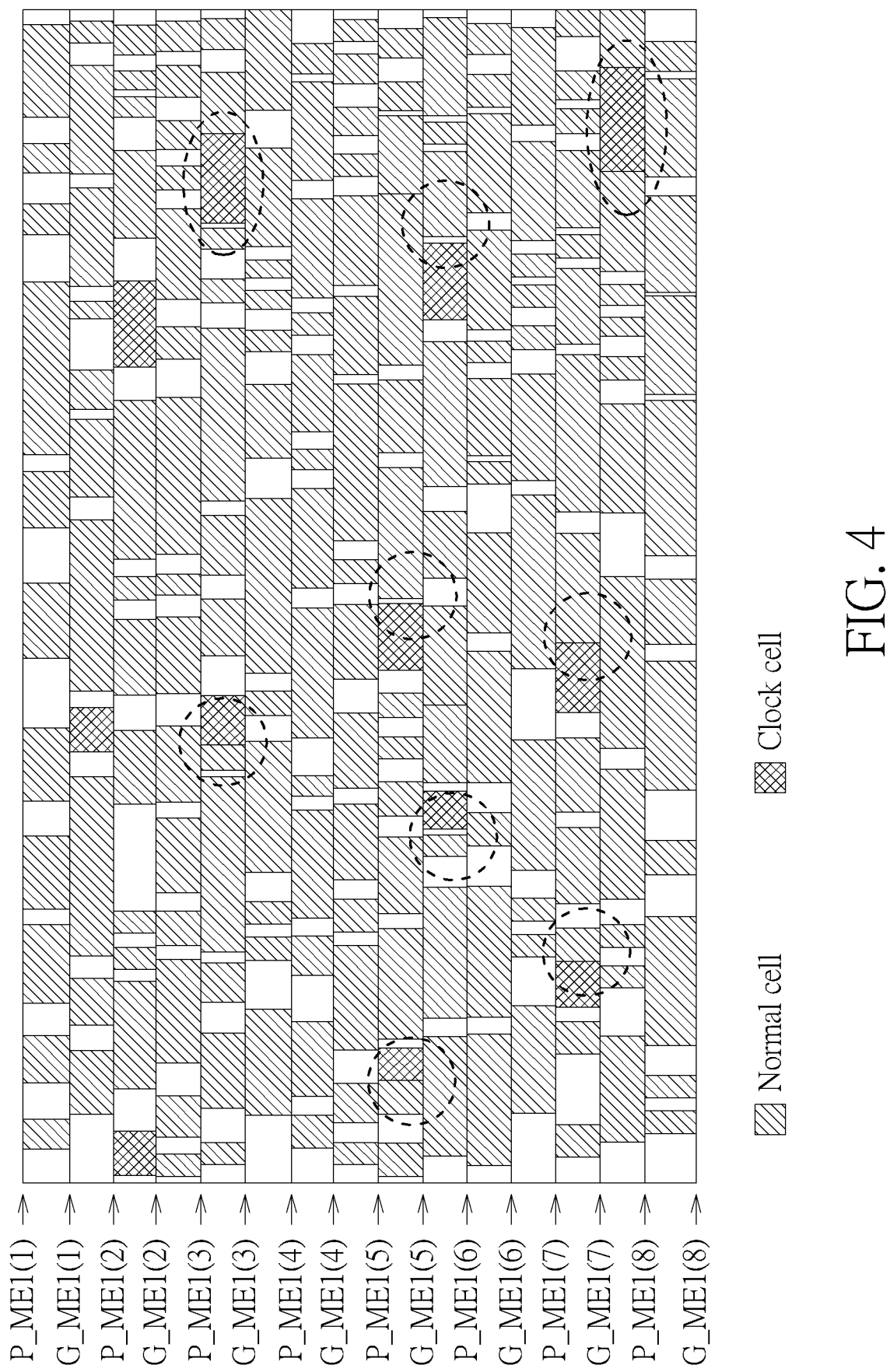
FIG. 4 illustrates an example of circuit architecture before executing the power mesh optimization procedure shown in FIG. 3.

FIG. 4 illustrates an example of circuit architecture before executing the power mesh optimization procedure shown in FIG. 3. Normal cells may be configured to perform normal operations, e.g. by being implemented as flip-flops, and clock cells may be configured to transmit a clock waveform(s), e.g. by being implemented as the multiple types of clock cells, such as buffers, inverters, etc. In addition, original wires P_ME1(1), P_ME1(2), P_ME1(3), P_ME1(4), P_ME1(5), P_ME1(6), P_ME1(7), P_ME1(8), etc. may be configured to couple this circuit architecture to a power voltage, and original wires G_ME1(1), G_ME1(2), G_ME1(3), G_ME1(4), G_ME1(5), G_ME1(6), G_ME1(7), G_ME1(8), etc. may be configured to couple this circuit architecture to a ground voltage. The above original wires {P_ME1(1), P_ME1(2), P_ME1(3), P_ME1(4), P_ME1(5), P_ME1(6), P_ME1(7), P_ME1(8), ... } and {G_ME1(1), G_ME1(2), G_ME1(3), G_ME1(4), G_ME1(5), G_ME1(6), G_ME1(7), G_ME1(8), ... } may be interlaced to allow the aforementioned normal cells and clock cells to be coupled to the power voltage and the ground voltage by this arrangement.

Figure 5:
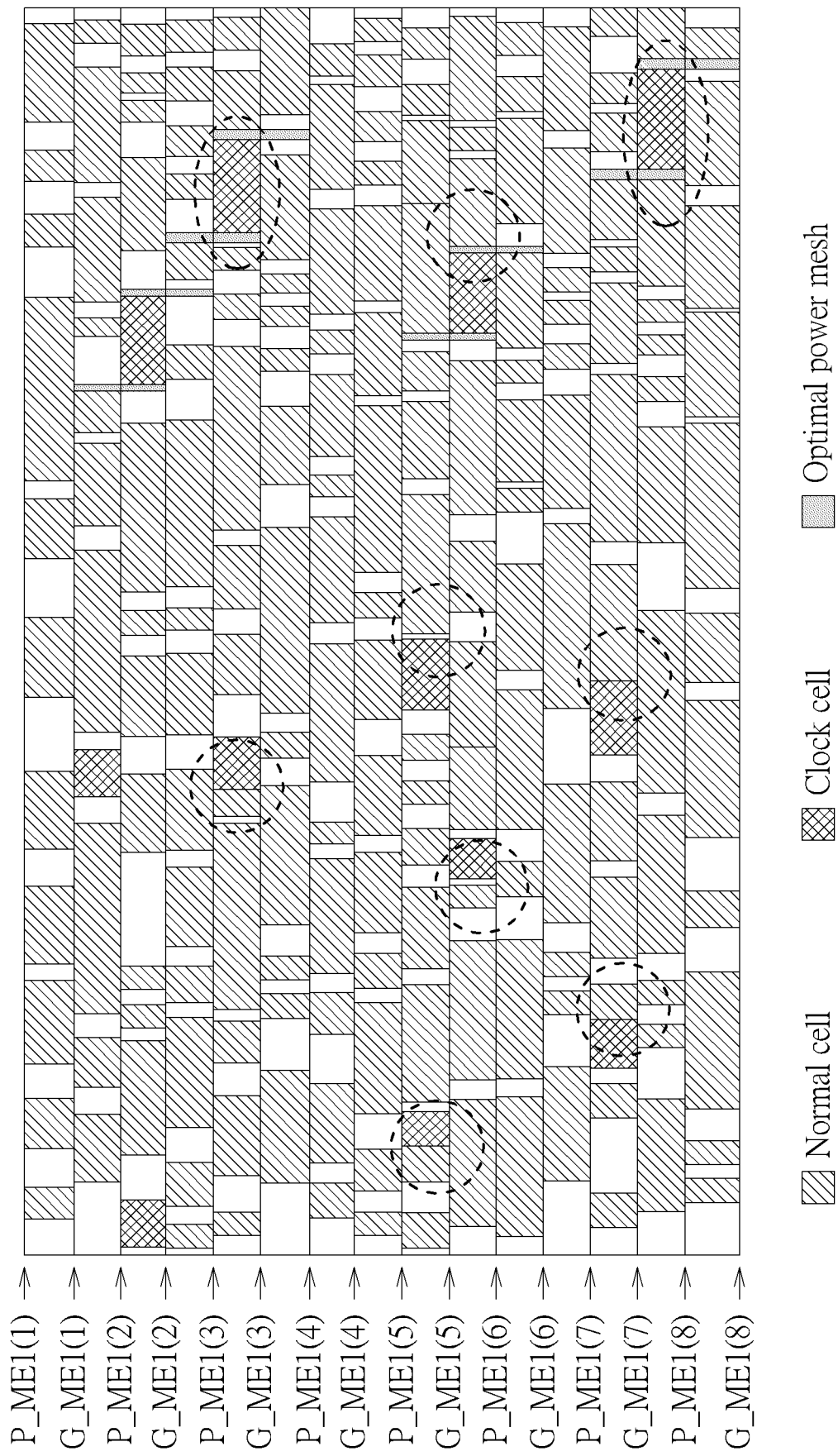
FIG. 5 illustrates a power mesh optimization result generated by the method shown in FIG. 2 according to an embodiment of the present invention.

FIG. 5 illustrates the power mesh optimization result generated by the method shown in FIG. 2 according to an embodiment of the present invention. In comparison with the circuit architecture shown in FIG. 4, in addition to the original power mesh such as the above original wires {P_ME1(1), P_ME1(2), P_ME1(3), P_ME1(4), P_ME1(5), P_ME1(6), P_ME1(7), P_ME1(8), ... } and {G_ME1(1), G_ME1(2), G_ME1(3), G_ME1(4), G_ME1(5), G_ME1(6), G_ME1(7), G_ME1(8), ... }, the power mesh optimization result may comprise optimal power mesh (e.g. the multiple sets of optimal power mesh, such as the multiple sets of additional wires crossing the multiple sets of original wires). For better comprehension, a bigger clock cell may have a stronger driving capability, and a smaller clock cell may have a weaker driving capability. More particularly, the respective sizes of the aforementioned any type of clock cells may correspond to respective driving abilities of the aforementioned any type of clock cells, and a driving capability of a certain clock cell may be described as a maximum number of clock cells of a next stage that this clock cell is able to drive, but the present invention is not limited thereto. After adding the optimal power mesh, some partial circuit which might be easily burned in this circuit architecture (such as places indicated by dashed circles) may become more robust.

During processing regarding the clock cells of the type A, the processing circuit 110 may perform power mesh enhancement on respective clock cells of a set of sub-types A1, A2, etc., and this involves adding corresponding sets of optimal power mesh respectively having wire widths Width (A1), Width (A2), etc. at the respective clock cells of the set of sub-types A1, A2, etc., wherein the wire widths Width (A1), Width(A2), etc. respectively correspond to the set of sub-types A1, A2, etc., and are matched with respective driving capabilities, corresponding power consumption and current thereof. The power mesh optimization result comprises these sets of optimal power mesh. During processing regarding the clock cells of the type B, the processing circuit 110 may perform power mesh enhancement on respective clock cells of a set of sub-types B1, B2, etc., and this involves adding corresponding sets of optimal power mesh respectively having wire widths Width (B1), Width (B2), etc. at the respective clock cells of the set of sub-types B1, B2, etc., where the wire widths Width(B1), Width(B2), etc. respectively correspond to the set of sub-types B1, B2, etc., and are matched with respective driving capabilities, corresponding power consumption and current thereof. The power mesh optimization result comprises these sets of optimal power mesh. The remaining procedures may be deduced by analogy. For brevity, similar descriptions for this embodiment are not repeated in detail here.

TABLE 1

| Sub-type | Clock cell | Wire width |
| --- | --- | --- |
| A1 | Cell(Index(n)), ... , Cell(Index(i1)) | Width(A1) |
| A2 | Cell(Index(i1 − 1)), ... , Cell(Index(i2)) | Width(A2) |

TABLE 1-continued

| Sub-type | Clock cell | Wire width |
|---|---|---|
| A3 | Cell(Index(i2 − 1)), . . . , Cell(Index(i3)) | Width(A3) |
| A4 | Cell(Index(i3 − 1)), . . . , Cell(Index(i4)) | Width(A4) |
| A5 | Cell(Index(i4 − 1)), . . . , Cell(Index(i5)) | X |
| A6 | Cell(Index(i5 − 1)), . . . , Cell(Index(i6)) | X |
| A7 | Cell(Index(i6 − 1)), . . . , Cell(Index(i7)) | X |
| A8 | Cell(Index(i7 − 1)), . . . , Cell(Index(i8)) | X |

Table 1 shows examples of the set of sub-types A1, A2, etc. and associated wire widths, where n>i1>i2>i3>i4>i5>i6>i7>i8>0, the symbol "Index( )" represents an index of a clock cell, and the symbol "X" represents "Don't care" which may indicate that there is no need for any additional wire. The plurality of clock cells may be referred to as clock cells {Cell(1), Cell(2), . . . , Cell(n)} (e.g. the symbol "n" may represent a positive integer), and the processing circuit 110 may obtain respective names {$num(1), $num(2), . . . , $num(n)} of the clock cells {Cell (1), Cell (2), . . . , Cell (n)} and define the clock cells {Cell(1), Cell(2), . . . , Cell(n)} as clock cells {Cell(1):$num (1), Cell(2):$num(2), . . . , Cell(n): $num(n)} respectively having the names {$num(1), $num(2), . . . , $num(n)}. During processing regarding the clock cells of the type A, the processing circuit 110 may generate a classification result as shown in Table 1, and more particularly, classify clock cells {{Cell(Index(n)), . . . , Cell(Index(i1))}, {Cell (Index(i1−1)), . . . , Cell(Index(i2))}, {Cell(Index (i2−1)), . . . , Cell(Index(i3))}, {Cell(Index(i3−1)), . . . , Cell(Index(i4))}, {Cell(Index(i4−1)), . . . , Cell(Index(i5))}, {Cell(Index(i5−1)), . . . , Cell(Index(i6))}, {Cell(Index(i6−1)), . . . , Cell(Index(i7))}, {Cell(Index(i7−1)), . . . , Cell(Index(i8))}} into sub-types {A1, A2, A3, A4, A5, A6, A7, A8}. In addition, the processing circuit 110 may determine that the sub-types {A1, A2, A3, A4} need to undergo power mesh enhancement, and set respective wire widths {Width(A1), Width(A2), Width(A3), Width(A4)} of the sub-types {A1, A2, A3, A4}. Similarly, the processing circuit 110 may perform similar operations regarding the remaining types (such as the types B, C and D) within the multiple types. Similar descriptions for this embodiment are not repeated in detail here for brevity.

According to some embodiments, the processing circuit 110 may limit routing resources related to the optimal power mesh (e.g. sizes of the set of sub-types (such as the sub-types {A1, A2, A3, A4}) selected in Step S23 and corresponding additional wires), and more particularly, prevent all additional wires of the optimal power mesh from occupying 0.2% (or above) of routing resources of a metal layer ME2 for trade-off.

Figure 6:
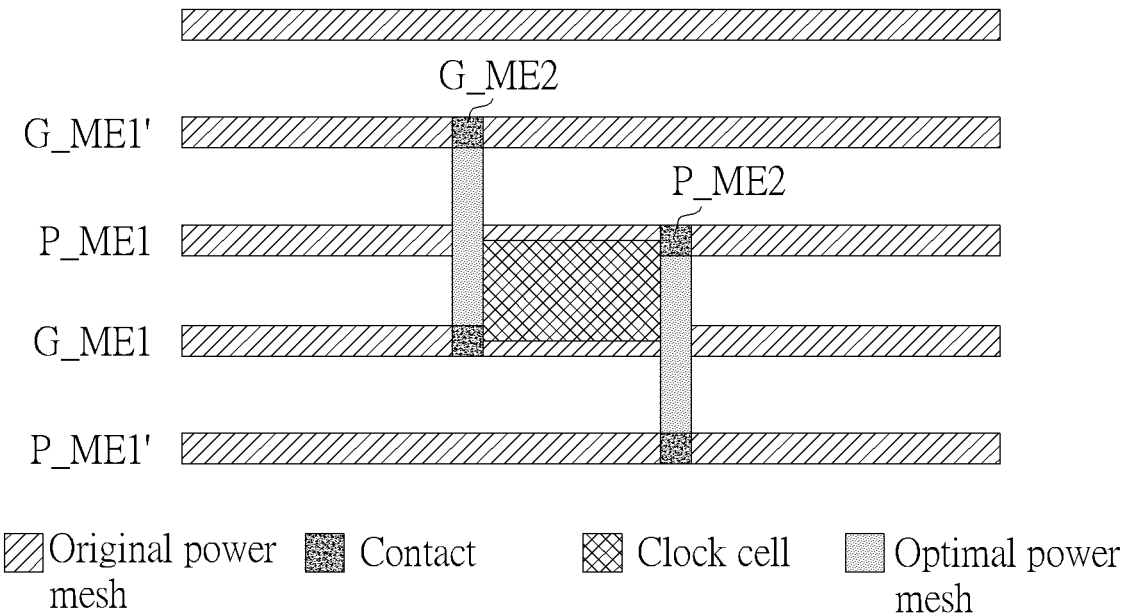
FIG. 6 illustrates a set of optimal power mesh generated by the method shown in FIG. 2 according to an embodiment of the present invention.

FIG. 6 illustrates a set of optimal power mesh generated by the method shown in FIG. 2 according to an embodiment of the present invention, where this set of optimal power mesh coupled to a certain clock cell may be an example of the set of optimal power mesh within Step S23 (more particularly, Step S23B). As shown in FIG. 6, this set of optimal power mesh, such as a set of additional wires P_ME2 and G_ME2 respectively crossing original wires P_ME1 and P_ME1' and original wires G_ME1 and G_ME1', may provide this clock cell with additional current paths, and these additional current paths may comprise the original wires P_ME1' and G_ME1' positioned in a metal layer ME1, the additional wire P_ME2 that is coupled to the original wires P_ME1 and P_ME1' respectively through two contacts and positioned in the metal layer ME2, and the additional wire G_ME2 that is coupled to the original wires G_ME1 and G_ME1' respectively through two contacts and positioned in the metal layer ME2. The above contacts may be implemented by vias between the metal layers ME1 and ME2, the original wires P_ME1 and P_ME1' may represent two of the original wires {P_ME1(1), P_ME1(2), . . . }, such as two power wires with consecutive numbers, and the original wires G_ME1 and G_ME1' may represent two of the original wires {G_ME1(1), G_ME1(2), . . . }, such as two ground wires with consecutive numbers, but the present invention is not limited thereto. Similar descriptions for this embodiment are not repeated in detail here for brevity.

According to some embodiments, the aforementioned additional current paths may comprise multiple original wires {P_ME1'} and multiple original wires {G_ME1'} positioned in the metal layer ME1, the additional wire P_ME2 that is coupled to the original wires P_ME1 and the multiple original wires {P_ME1'} respectively through three or more contacts and positioned in the metal layer ME2, and the additional wire G_ME2 that is coupled to the original wires G_ME1 and the multiple original wires {G_ME1'} respectively through three or more contacts and positioned in the metal layer ME2, where the above contacts may be implemented by vias between the metal layers ME1 and ME2. The original wires P_ME1 and the multiple original wires {P_ME1'} may represent three or more of the original wires {P_ME1(1), P_ME1(2), . . . }, such as power wires with consecutive numbers, and the original wires G_ME1 and the multiple original wires {G_ME1'} may represent three or more of the original wires {G_ME1(1), G_ME1(2), . . . }, such as ground wires with consecutive numbers. Similar descriptions for this embodiment are not repeated in detail here for brevity.

Figure 7:
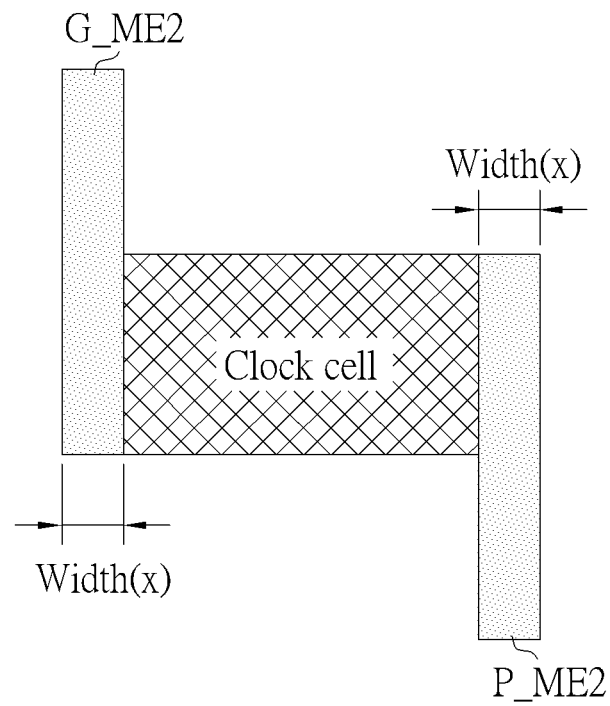
FIG. 7 illustrates a width control scheme of the method shown in FIG. 2 according to an embodiment of the present invention.

FIG. 7 illustrates a width control scheme of the method shown in FIG. 2 according to an embodiment of the present invention. The processing circuit 110 may re-execute the power mesh optimization procedure according to at least one updated parameter of the power mesh optimization procedure to update the power mesh optimization result. For example, the aforementioned at least one updated parameter may comprise an updated wire width, such as a wire width Width(x), but the present invention is not limited thereto. According to some embodiments, the aforementioned at least one updated parameter may vary. For example, the aforementioned at least one parameter may comprise an updated contact count, where the updated contact count represents a number of contacts (e.g. vias) between a wire within the set of additional wires and the set of original wires. In another example, the aforementioned at least one updated parameter may comprise the updated wire width (such as the wire width Width(x)) and the updated contact count.

Figure 8:
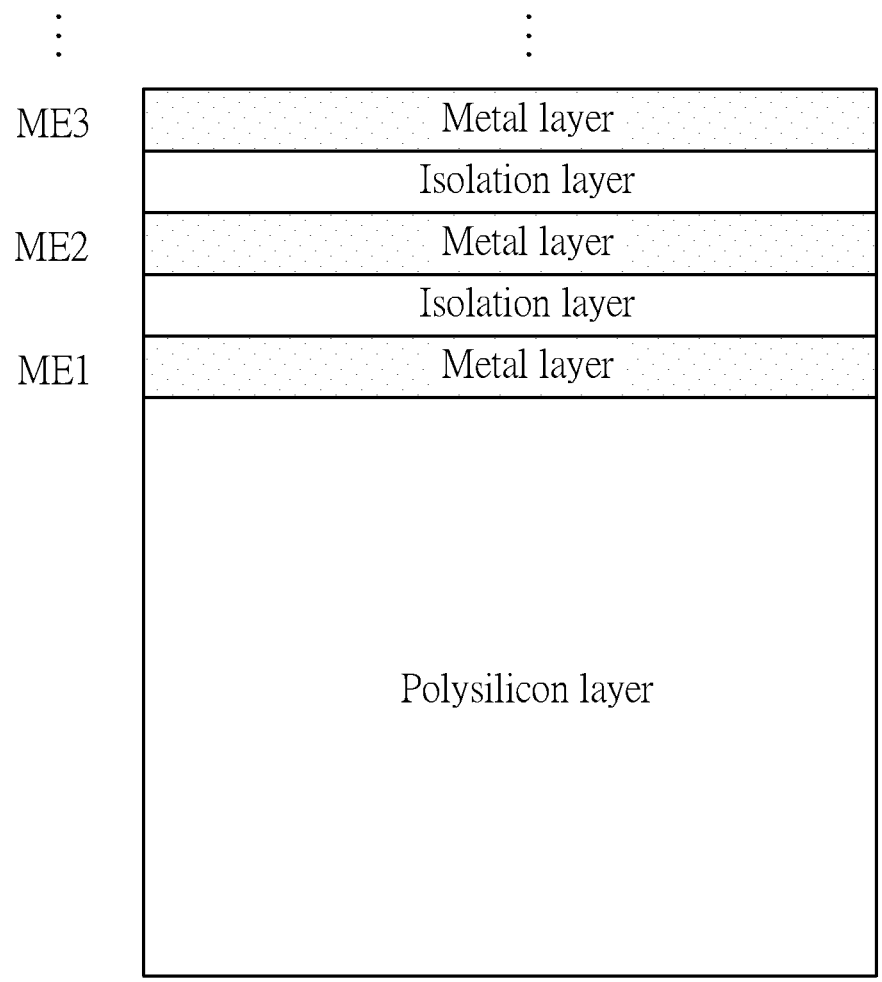
FIG. 8 illustrates multi-layer architecture utilized by the method shown in FIG. 2 according to an embodiment of the present invention.

FIG. 8 illustrates multi-layer architecture utilized by the method shown in FIG. 2 according to an embodiment of the present invention, where the multi-layer architecture comprises a polycrystalline silicon (polysilicon) layer and multiple metal layers {ME1, ME2, ME3, . . . } and multiple isolation layers thereon, and the multiple isolation layers are respectively positioned between the multiple metal layers {ME1, ME2, ME3, . . . }. The plurality of clock cells may be positioned in the polysilicon layer and a first metal layer thereon such as the metal layer ME1, the original power mesh may be positioned in the first metal layer such as the metal layer ME1, and the set of optimal power mesh may be positioned in a second metal layer above the first metal layer, such as the metal layer ME2. Similar descriptions for this embodiment are not repeated in detail here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing power mesh optimization with the aid of additional wires, the method being applicable to a clock tree, the method comprising:
   reading a clock cell definition file to obtain respective basic information of a plurality of clock cells in a circuit design, wherein basic information of a clock cell within the plurality of clock cells at least indicates a type and a size of the clock cell; and
   according to the respective basic information of the plurality of clock cells, executing a power mesh optimization procedure to generate a power mesh optimization result, wherein the power mesh optimization procedure comprises:
      regarding any type of clock cells in multiple types of clock cells within the plurality of clock cells, classifying said any type of clock cells into a plurality of sub-types according to respective sizes of said any type of clock cells; and
      performing power mesh enhancement on respective clock cells of a set of sub-types within the plurality of sub-types, to add a set of additional wires crossing a set of original wires in an original power mesh at each clock cell of any sub-type of the set of sub-types to act as a set of optimal power mesh, wherein a wire width of the set of optimal power mesh corresponds to said any sub-type, and the power mesh optimization result comprises the original power mesh and the set of optimal power mesh.

2. The method of claim 1, further comprising:
   according to the power mesh optimization result, performing clock tree synthesis (CTS) on the circuit design to generate a synthesis result, wherein the synthesis result indicates routing of at least one clock tree within the circuit design; and
   according to the synthesis result, performing at least one check operation to generate at least one check result, for determining whether to re-execute the power mesh optimization procedure, wherein said at least one check result indicates whether the routing of said at least one clock tree satisfies requirements regarding at least one check item.

3. The method of claim 2, further comprising:
   in response to said at least one check result, re-executing the power mesh optimization procedure according to at least one updated parameter of the power mesh optimization procedure to update the power mesh optimization result.

4. The method of claim 1, wherein the multiple types of clock cells comprise a first type of clock cells and a second type of clock cells; and the power mesh optimization procedure comprises:
   classifying the first type of clock cells into a plurality of first sub-types according to respective sizes of the first type of clock cells;
   performing power mesh enhancement on respective clock cells of a set of first sub-types within the plurality of first sub-types, to add a set of first additional wires crossing a set of first original wires in the original power mesh at each clock cell of any first sub-type of the set of first sub-types to act as a set of first optimal power mesh, wherein a first wire width of the set of first optimal power mesh corresponds to said any first sub-type, and the power mesh optimization result comprises the set of first optimal power mesh;
   classifying the second type of clock cells into a plurality of second sub-types according to respective sizes of the second type of clock cells; and
   performing power mesh enhancement on respective clock cells of a set of second sub-types within the plurality of second sub-types, to add a set of second additional wires crossing a set of second original wires in the original power mesh at each clock cell of any second sub-type of the set of second sub-types to act as a set of second optimal power mesh, wherein a second wire width of the set of second optimal power mesh corresponds to said any second sub-type, and the power mesh optimization result comprises the set of second optimal power mesh.

5. The method of claim 1, wherein the plurality of clock cells are positioned on a polycrystalline silicon layer and a first metal layer thereon, the original power mesh is positioned on the first metal layer, and the set of optimal power mesh is positioned on a second metal layer above the first metal layer.

6. The method of claim 1, wherein the multiple types of clock cells comprise a first type of clock cells, a second type of clock cells, a third type of clock cells and a fourth type of clock cells, wherein the first type of clock cells comprises buffers and inverters, the second type of clock cells comprises multiplexers, the third type of clock cells comprises NOR gates, and the fourth type of clock cells comprises AND gates.

7. The method of claim 1, wherein the respective sizes of said any type of clock cells correspond to respective driving capabilities of said any type of clock cells.

8. The method of claim 1, further comprising:
   re-executing the power mesh optimization procedure according to at least one updated parameter of the power mesh optimization procedure to update the power mesh optimization result, wherein said at least one updated parameter comprises an updated wire width.

9. The method of claim 8, wherein said at least one updated parameter comprises an updated contact count, wherein the updated contact count represents a count of contacts between a wire within the set of additional wires and the set of original wires.

10. An apparatus for performing power mesh optimization with the aid of additional wires, the apparatus being applicable to a clock tree, the apparatus comprising:
   a processing circuit, configured to execute a program code corresponding to a power mesh optimization procedure to control operations of the apparatus, for executing the power mesh optimization procedure; and
   a storage device, coupled to the processing circuit, configured to store a clock cell definition file for being read by the processing circuit;
   wherein:
   the processing circuit reads the clock cell definition file to obtain respective basic information of a plurality of clock cells in a circuit design, wherein basic information of a clock cell within the plurality of clock cells at least indicates a type and a size of the clock cell; and
   according to the respective basic information of the plurality of clock cells, the processing circuit executes the power mesh optimization procedure to generate a power mesh optimization result, wherein the power mesh optimization procedure comprises:

regarding any type of clock cells in multiple types of clock cells within the plurality of clock cells, the processing circuit classifies said any type of clock cells into a plurality of sub-types according to respective sizes of said any type of clock cells; and the processing circuit performs power mesh enhancement on respective clock cells of a set of sub-types within the plurality of sub-types, to add a set of additional wires crossing a set of original wires in an original power mesh at each clock cell of any sub-type of the set of sub-types to act as a set of optimal power mesh, wherein a wire width of the set of optimal power mesh corresponds to said any sub-type, and the power mesh optimization result comprises the original power mesh and the set of optimal power mesh.

11. The apparatus of claim 10, wherein:

according to the power mesh optimization result, the processing circuit performs clock tree synthesis (CTS) on the circuit design to generate a synthesis result, wherein the synthesis result indicates routing of at least one clock tree within the circuit design; and according to the synthesis result, the processing circuit performs at least one check operation to generate at least one check result, for determining whether to re-execute the power mesh optimization procedure, wherein said at least one check result indicates whether the routing of said at least one clock tree satisfies requirements regarding at least one check item.

12. The method of claim 11, wherein in response to said at least one check result, the processing circuit re-executes the power mesh optimization procedure according to at least one updated parameter of the power mesh optimization procedure to update the power mesh optimization result.

13. The method of claim 10, wherein the multiple types of clock cells comprise a first type of clock cells and a second type of clock cells; and the power mesh optimization procedure comprises:

the processing circuit classifies the first type of clock cells into a plurality of first sub-types according to respective sizes of the first type of clock cells;

the processing circuit performs power mesh enhancement on respective clock cells of a set of first sub-types within the plurality of first sub-types, to add a set of first additional wires crossing a set of first original wires in the original power mesh at each clock cell of any first sub-type of the set of first sub-types to act as a set of first optimal power mesh, wherein a first wire width of the set of first optimal power mesh corresponds to said any first sub-type, and the power mesh optimization result comprises the set of first optimal power mesh;

the processing circuit classifies the second type of clock cells into a plurality of second sub-types according to respective sizes of the second type of clock cells; and the processing circuit performs power mesh enhancement on respective clock cells of a set of second sub-types within the plurality of second sub-types, to add a set of second additional wires crossing a set of second original wires in the original power mesh at each clock cell of any second sub-type of the set of second sub-types to act as a set of second optimal power mesh, wherein a second wire width of the set of second optimal power mesh corresponds to said any second sub-type, and the power mesh optimization result comprises the set of second optimal power mesh.

14. The method of claim 10, wherein the plurality of clock cells are positioned on a polycrystalline silicon layer and a first metal layer thereon, the original power mesh is positioned on the first metal layer, and the set of optimal power mesh is positioned on a second metal layer above the first metal layer.

15. The method of claim 10, wherein the multiple types of clock cells comprise a first type of clock cells, a second type of clock cells, a third type of clock cells and a fourth type of clock cells, wherein the first type of clock cells comprises buffers and inverters, the second type of clock cells comprises multiplexers, the third type of clock cells comprises NOR gates, and the fourth type of clock cells comprises AND gates.

16. The method of claim 10, wherein the respective sizes of said any type of clock cells correspond to respective driving capabilities of said any type of clock cells.

17. The method of claim 10, further comprising:

the processing circuit re-executes the power mesh optimization procedure according to at least one updated parameter of the power mesh optimization procedure to update the power mesh optimization result, wherein said at least one updated parameter comprises an updated wire width.

18. The method of claim 17, wherein said at least one updated parameter comprises an updated contact count, wherein the updated contact count represents a count of contacts between a wire within the set of additional wires and the set of original wires.

* * * * *